J. POTTS.

Try-Square Gage.

No. 98,106.

Patented Dec. 21, 1869.

Witnesses;

Inventor;

United States Patent Office.

JOSIAH POTTS, OF MILWAUKEE, WISCONSIN.

Letters Patent No. 98,106, dated December 21, 1869.

IMPROVEMENT IN COMBINED SQUARE AND CALIPER.

The Schedule referred to in these Letters Patent and making part of the same

*To all whom it may concern:*

Be it known that I, JOSIAH POTTS, of Milwaukee, in the county of Milwaukee, and State of Wisconsin, have invented a new and useful Improvement in Square, Gauge, and Level; and I do hereby declare that the following is a full, clear, and exact description thereof, which will enable others skilled in/the art to make and use the same, reference being had to the accompanying drawing, forming part of this specification.

This invention relates to a new and useful improvement in tool for mechanics' use, and consists in combining, with a try-square, a spirit-level and a surface-gauge, whereby mechanical operations are greatly facilitated.

In the accompanying drawing—

Similar letters of reference indicate corresponding parts.

Figure 2:
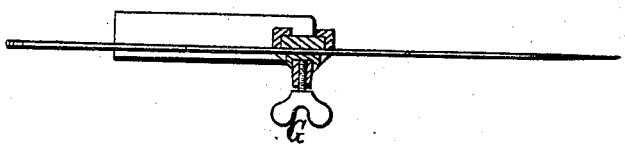
Figure 2 is a cross-section of fig. 1, through the line x x.
Figure 1:
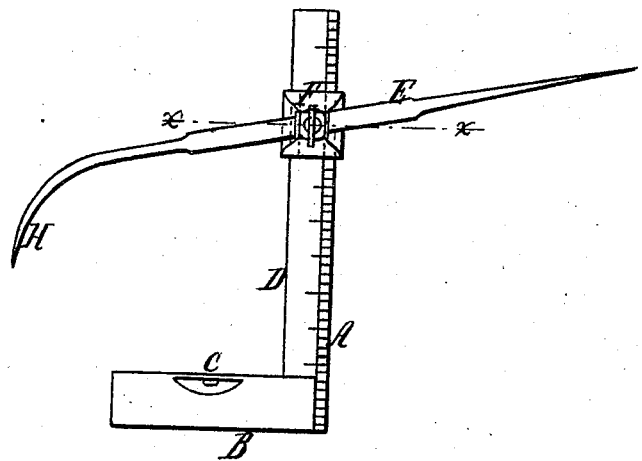
Figure 1 represents a side view of the combined tool, with the gauge, and the gauge-slide in place as when in use.

A is a try square, formed in the ordinary manner, except that the stock B forms a spirit-level, as seen at C.

It will be seen that the spirit-tube is visible from the sides, as it also is from the face of the stock, so that the stock may be levelled and the tongue D of the square placed in a perpendicular position, by viewing the spirit from the sides.

E is the surface-gauge, which is attached to the tongue of the square by means of the slide F and the thumb-screw G, by which it is adjusted and fastened in any position on the tongue.

The gauge is adjustable in the slide, when thus attached, as either end may be depressed or raised for marking a certain distance above a level surface, when the square is placed on such a surface as seen in the drawing.

By the curved end of the gauge H, a line may be drawn, or a mark made on a horizontal surface above that on which the square is placed.

In designating the position of holes to be bored or drilled, and marking distances on vertical or other surfaces from a "level," this tool will be found of the greatest service.

When the gauge is not required, it may be slipped from the tongue of the square by loosening the thumb-screw.

Having thus described my invention,

What I claim as new, and desire to secure by Letters Patent, is—

1. In combination with a try-square, the surface-gauge E, connected with the square by means of the slide F and thumb-screw G, and arranged and operating substantially as described.

2. The combination of the gauge E and the spirit-level, (as seen at C,) with a try-square, substantially as described.

JOSIAH POTTS.

Witnesses:
 DON. O. LEWIS,
 T. L. PIETSCHMAN.